Dec. 25, 1962  R. H. BERKSHIRE ET AL  3,069,755
METHOD FOR MAKING MULTI-UNIT ELECTROMAGNETIC HEAD
Filed Nov. 21, 1955  7 Sheets-Sheet 1

Fig. 1.

INVENTORS
ROBERT H. BERKSHIRE
AND LLOYD E. JONES
BY Stevens, Davis, Miller & Mosher
ATTORNEYS

INVENTORS
ROBERT H. BERKSHIRE
AND LLOYD E. JONES
BY Stevens, Davis, Miller and Mosher
ATTORNEYS

INVENTORS
ROBERT H. BERKSHIRE
AND LLOYD E. JONES
BY Stevens, Davis, Miller & Mosher
ATTORNEYS Dec. 25, 1962 R. H. BERKSHIRE ET AL 3,069,755
METHOD FOR MAKING MULTI-UNIT ELECTROMAGNETIC HEAD
Filed Nov. 21, 1955 7 Sheets-Sheet 7

INVENTORS
ROBERT H. BERKSHIRE
AND LLOYD E. JONES
BY Stevens, Davis, Miller and Mosher
ATTORNEYS United States Patent Office 3,069,755
Patented Dec. 25, 1962

3,069,755
METHOD FOR MAKING MULTI-UNIT ELECTRO-MAGNETIC HEAD
Robert H. Berkshire and Lloyd E. Jones, Dallas, Tex., assignors to Texas Instruments Incorporated, Dallas, Tex., a corporation of Delaware
Filed Nov. 21, 1955, Ser. No. 547,931
9 Claims. (Cl. 29—155.58)

This invention relates to magnetic recording equipment and provides an improved electromagnetic head for recording or play-back purposes. More particularly, the present invention relates to a novel construction for a multi-unit electromagnetic head for recording or playback wherein the electromagnetc components are incapsulated in a plastic mass and to the method for making such incapsulated multi-unit electromagnetic heads.

In a typical magnetic recording technique, a magnetizable record medium in the form of a tape, disc, etc. is passed through the field of an electromagnet, which is being variably energized by the wave motion of the information to be recorded. On play-back the record is passed closely by a magnetizable pickup head having a coil wrapped around it in which is induced a voltage which varies in accordance with the recorded information.

In seismic surveying it is desirable to pick up and magnetically record a number of seismic waves side by side on a suitable record medium such as a tape or disc. Accordingly, it is advantageous to have the recording and play-back heads as small as possible so that a maximum number of channels can be recorded side by side of the record medium while at the same time ensuring that there be no interference or overlap between channels.

As will be evident fro mthe above, multi-unit recording heads have previously been made. In prior constructions, however, great difficulty has been experienced in obtaining proper alignment and spacing of the individual units of the multi-unit head. Also, previous efforts have not been fully successful in developing a multi-unit head which will allow the maximum number of channels to be recorded side by side on the record medium without sacrifices of faithfulness in recording and reproduction.

Accordingly, it is a principal object of the present invention to provide a compact, rugged and novel structure for a multi-unit electromagnetic head which allows for construction of the multi-unit head in very small sizes without affecting its ability to faithfully record and reproduce.

It is another object of the present invention to provide a novel multi-unit electromagnetic head in which the individual electromagnetic components of the multi-unit head are durably held in fixed spaced relationships by virtue of being incapsulated in a plastic mass.

It is a further object of the present invention to provide a unique method for making a multi-unit electromagnetic head which will permanently ensure the proper dimensioning and relationships between the various electromagnetic components of the head.

It is a further object of the present invention to provide a novel structure for a multi-unit electromagnetic head which is simple, compact and durable and which will have superior operational characteristics and greater versatility than multi-unit arrangements heretofore available.

It is a still further object of the present invention to provide a method for making multi-unit electromagnetic heads which can be carried out in an efficient and expedient fashion to produce compact electromagnetic heads accurately dimensioned.

It is yet another object of the present invention to provide novel stacking and clamping fixtures which will facilitate the production of the electromagnetic head of the present invention.

Other and further objects of the present invention will become readily apparent from the following discussion when taken in conjunction with the drawings in which.

Figure 1:
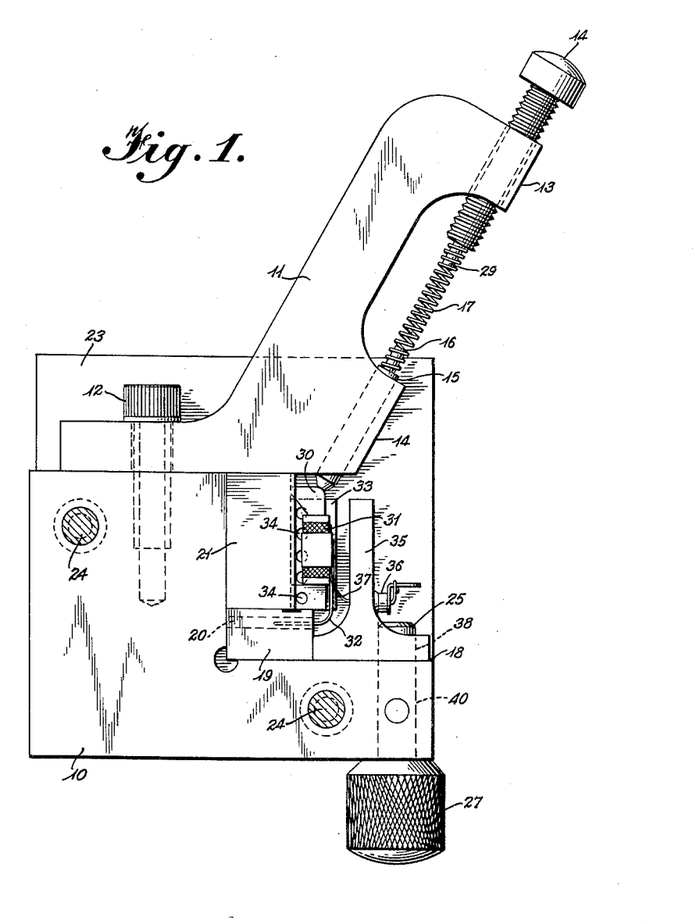
FIGURE 1 is a view in side elevation showing a stacking fixture with the near side plate removed.
Figure 2:
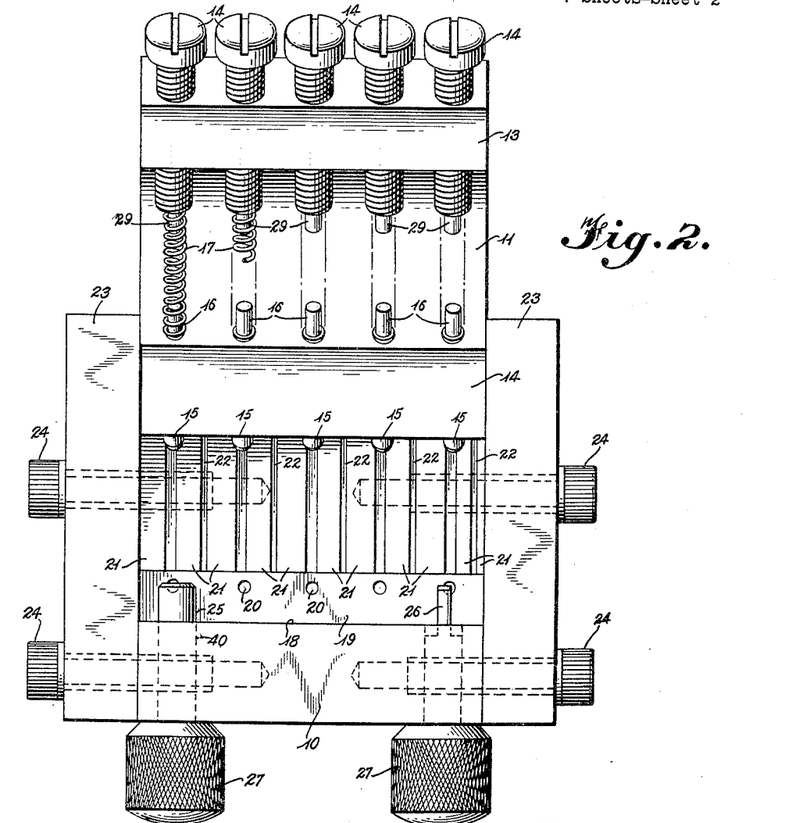
FIGURE 2 is a view in front elevation of the stacking fixture depicted in FIGURE 1.
Figure 3:
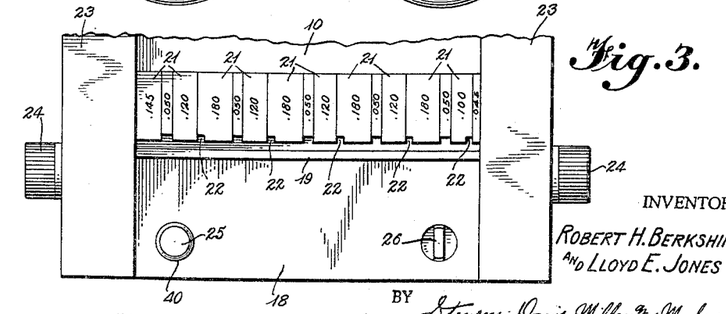
FIGURE 3 is a fragmentary view in plan of the stacking fixture showing one arrangement of the gauge blocks of the fixture.

Referring now to the drawings, there will be described the novel multi-unit electromagnetic head and the method for producing same. Referring initially to FIGURES 1 to 3, the first step of the method will be described.

There is shown in FIGURES 1 to 3 a stacking fixture suitable for producing a right half subassembly of a multi-unit electromagnetic head. The stacking fixture is comprised of a main body 10, all surfaces of which are mutually perpendicular within a tolerance of 0.0003 inch. Fixed onto the top surface of the main body 10 is a yoke 11. The yoke is attached to the main body 10 by means of two Allen-head cap screws 12. The yoke 11 is characterized by two leg portions 13 and 14 which define with the main portion of the yoke a U-shaped section. Threaded through the top leg portion 13 are a series of five set screws 14 each of which terminates with a pin portion 29. In alignment with each threaded hole in the leg portion 13 there is defined in the leg portion 14 a hole of smooth bore. Slidably received in the five holes in leg portion 14 are five nylon plungers 15 each of which terminates at its end nearest the set screws 14 with a pin portion 16. Received on each set of pin portions 29 and 16 are the ends of a spring 17. By virtue of this arrangement a thrust will be exerted on the nylon plungers 15 tending to urge them downwardly and obliquely with a force depending upon the relative positions of the set screws 14 with reference to the leg portion 13.

Received on the flat surface 18 of the main body 10 is a gauge block 19 which is 0.250 of an inch high within a tolerance of 0.001, characterized by a series of five holes 20 spaced apart center-to-center about 0.35 inch. The holes 20 extend parallel to the surface 18 and transversely through the block 19. Positioned on top of the block 19 and against the vertical surface of the main body 10 which intersects with surface 18 are a series of gauge blocks 21. The gauge blocks are specially designed to define vertical slots of 0.050 inch in width spaced apart 0.350 inch. To the right of each 0.050 inch slot as viewed in FIGURE 3 is a vertical slot identified by the numeral 22, the function of which will become clear as the description progresses. As will be evident from FIGURE 3 the 0.050 inch slots are symmetrically disposed along the gauge blocks 21 whereas the slots 22 are not. Fixed to either side of the main body 10 is a side plate 23. For this purpose, Allen-head cap screws 24 are employed. The main body 10 is drilled out along its front edge at two places 40 normal to surface 18, and received within the two bores are pins 25 and 26. Each pin projects above the surface 18 at one end and has attached to its other end a knurled knob 27 by any convenient means such as a set screw.

Into this stacking fixture, as described, there are positioned five U-shaped laminated core halves 30. Each laminated core half 30 is fitted into one of the 0.050 inch slots formed by the gauge blocks 21, and the nylon plungers 15 are caused to bear against the top right edges of the core halves, as viewed in FIGURE 1, to urge them downwardly and to the left into the slots. Each laminated core half 30 has wound around it a coil 31 with one lead 32 of the coil being received in a hole 20 defined by the block 19. Positioned in the slots 22 defined by the gauge blocks to the right of each 0.050 inch slot is a spacer element 33 which defines a series of vertically aligned holes 34. The spacers 33 effectively serve as magnetic shields in the final construction and may be composed of Mu metal or other high permeability material. Their essential function is to cut down cross talk between adjacent heads. A starting piece 35 is then placed on the surface 18 with its base close to the block 19. The base of piece 35 is flat across 75% of its surface within a tolerance of 0.0001 of an inch. The starting piece 35 defines a pair of holes 38 into which are received pins 25 and 26. The holes 40 in the main body 10 and 38 in the starting piece 35 through which are received pins 25 and 26 are carefully bored so that with the pins in place the starting piece 35 is located from 0.010 to 0.015 inch from the block 19 and the left edge of the laminated core half 30 furthest to the right (see FIGURE 4) coincides with the centerline of hole 38 and pin 25 within a tolerance of 0.0015 of an inch. The starting piece 35 defines a threaded hole 39 to facilitate mounting of the assembly when completed and a series of five horizontally spaced holes into which are mounted a series of terminal members 36. The other lead 37 of each coil 31 is passed through a hole in the aluminum starting piece 35 and soldered to the terminal member 36. This can conveniently be done by stripping back the lead, wrapping around the back of the terminal and soldering in place.

Thereafter a suitable incapsulating composition such as an epoxy-type resin or like material having very low shrinkage characteristics is poured into the space defined between the gauge blocks 21 and the aluminum starting piece 35. As a result of this the laminated core halves 30, the spacers 33, and the coils 31 are all incapsulated in a plastic mass which bonds to the aluminum starting piece 35. The arrangement of the stacking fixture is such that all dimensions on the gauge blocks are referenced to the pin 25 and because of this all dimensions of the subassembly including the aluminum starting piece 35, the laminated core halves 30 and coils 31, and the spacers 33 can be referenced to the hole 38 in the aluminum starting piece 35 which receives pin 25 through it. Further, by virtue of gauge block 19, the bottom edge of all core halves 30 will be 0.250 of an inch above the bottom surface of piece 35 within the tolerance set forth above.

Figure 4:
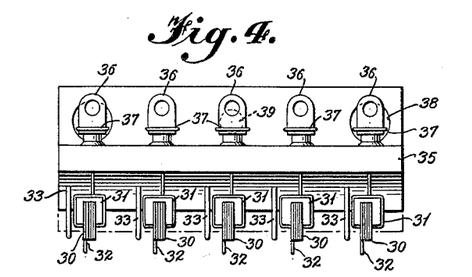
FIGURE 4 is a view in plan of the right half subassembly of a multi-unit electromagnetic head after it has been removed from the stacking fixture of FIGURE 1.
Figure 5:
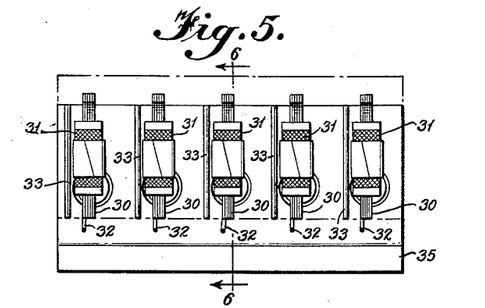
FIGURE 5 is a view in elevation of the subassembly shown in FIGURE 4.
Figure 6:
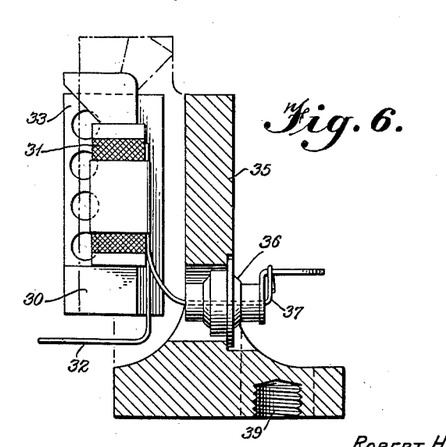
FIGURE 6 is a view in section taken along line 6—6 of FIGURE 5.

After the plastic mass has set and hardened, the subassembly is removed from the stacking fixture by withdrawing the plungers 15 and withdrawing the pins 25 and 26. The resulting subassembly is designated as a right half subassembly and is shown in FIGURES 4 to 6. For purposes of clarity, the outline of the incapsulating resin is shown in these figures in dot-dash lines. As will be apparent, all parts of the laminated cores 30 and the spacers 33 will be incapsulated in the resinous material with the exception of those parts of these elements which were received in the slots defined by the gauge blocks and in contact with the plungers 15. This is best graphically illustrated in FIGURE 6. Note that the dot-dash line indicating the resin falls to the right of the left edge or face of each of the laminated core halves 30 and spacers 33 by 0.040 of an inch. By virtue of the leads 32 being placed into the holes 20 in block 19 prior to the pouring of the resinous material, these leads 32 project from the plastic mass. The faces of the laminated core halves 30 which project from the plastic mass are ground and lapped until the plane of their surfaces lies 0.5398 of an inch from the center line of hole 38. Also, the faces of the core halves 30 are finished flat within a tolerance of 0.000020 of an inch and perpendicular with the bottom surface of piece 35 with a tolerance of 30 seconds (angular measure).

Upon conclusion of the production of the right half subassembly, the left half subassembly is then made. Since the right half subassembly is not symmetrical, it becomes necessary to rearrange the gauge blocks 21 in order to produce a mirror image of the right half subassembly. This is the only change in the stacking fixture that is required. With the gauge blocks 21 rearranged, the left half subassembly is made in the same manner as the right half subassembly. All parts of the left half subassembly shown in the drawings have been designated by the same reference numerals assigned to the corresponding parts of the right half subassembly but suffixed with a prime. When completed, the two subassemblies are ready to be joined together. This is accomplished by using the clamping fixture illustrated in FIGURES 7 to 9.

Figure 7:
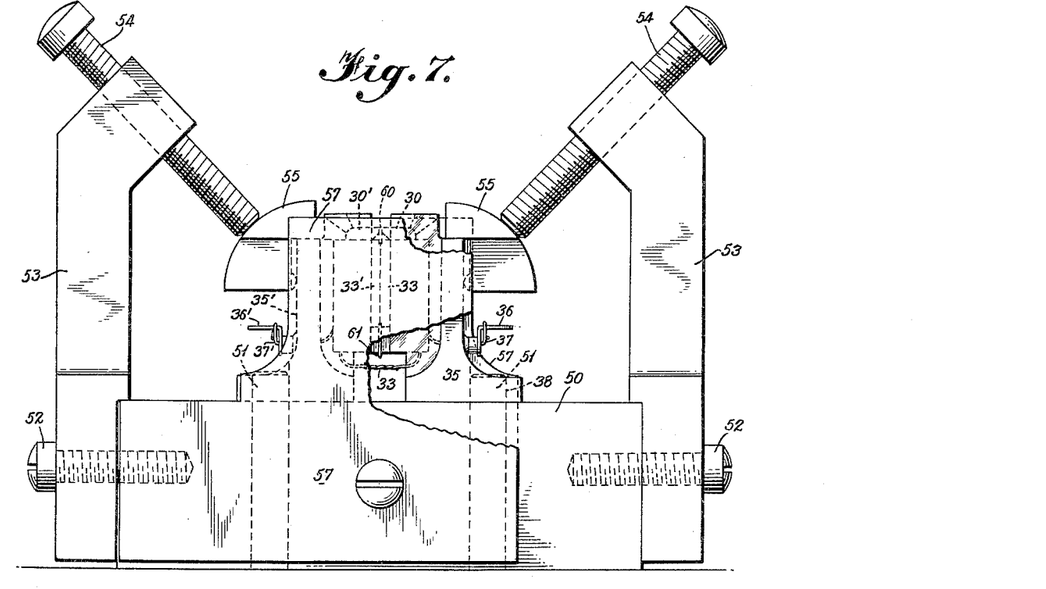
FIGURE 7 is a view in side elevation showing the left and right half subassemblies of a multi-unit electromagnetic head mounted in a clamping fixture.
Figure 8:
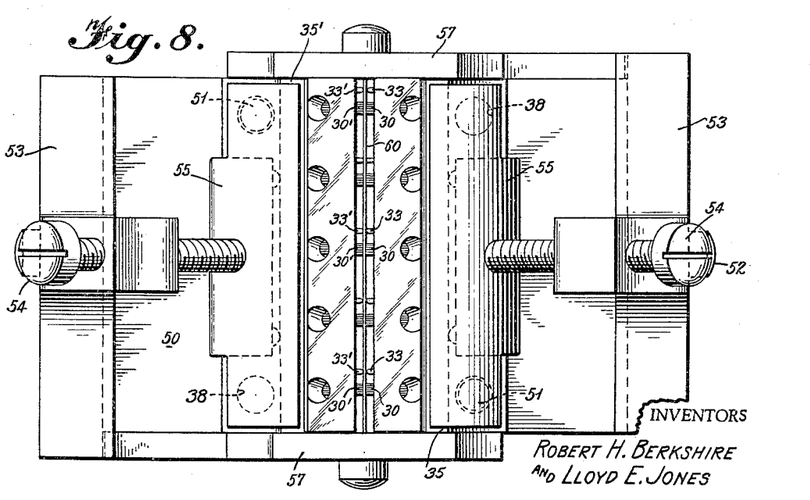
FIGURE 8 is a view in plan of the clamping fixture shown in FIGURE 7.
Figure 9:
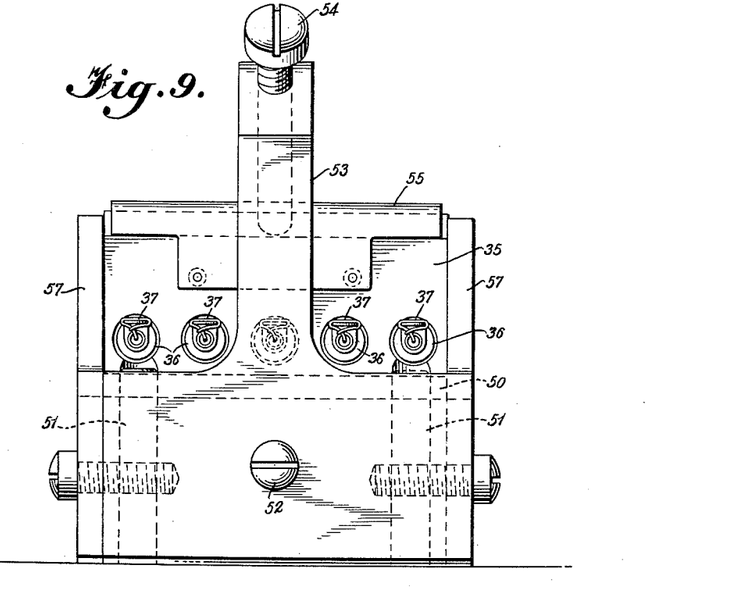
FIGURE 9 is a view in end elevation of the clamping fixture shown in FIGURE 7.

The fixture is comprised of a base 50 the top and bottom surfaces of which are flat within a tolerance of 0.0003 of an inch and are perpendicular to flat parallel side surfaces within the same tolerance. A pair of holes 0.1875 of an inch in diameter within a tolerance of +0.0003 and −0.0000 are bored in the bed 50. The centers of these holes are spaced apart 1.0800 inches within a tolerance of 0.0005 longitudinally of the bed 50 and are spaced apart 1.3500 inches within a tolerance of 0.0005 transversely of bed 50. Thus, the centers of the holes will lie 1.7289 inches apart within a tolerance of 0.0005.

Figure 10:
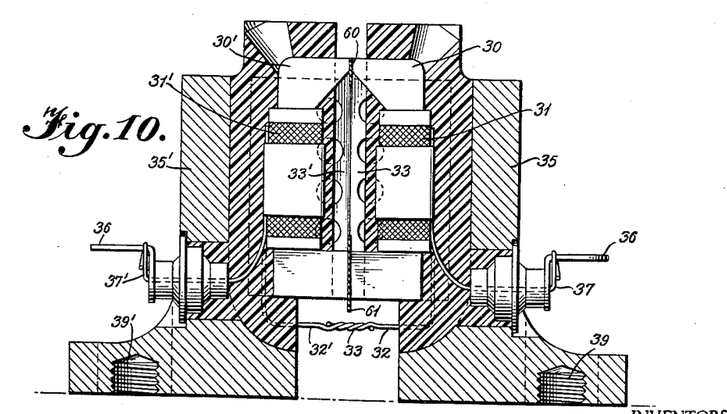
FIGURE 10 is a view in transverse section showing the left and right half subassemblies after they are placed together in the clamping fixture of FIGURE 7.
Figure 11:
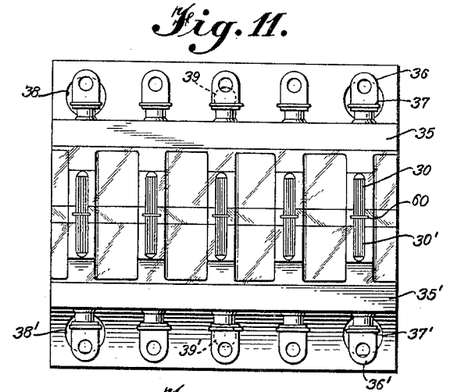
FIGURE 11 is a view in plan of the finished multi-unit recorder head.
Figure 12:
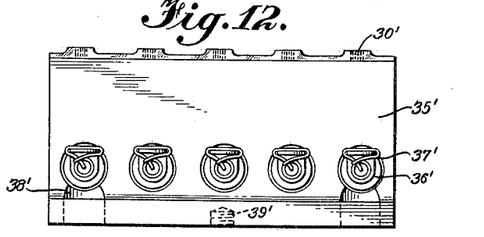
FIGURE 12 is a view in side elevation of the finished multi-unit recorder head.
Figure 13:
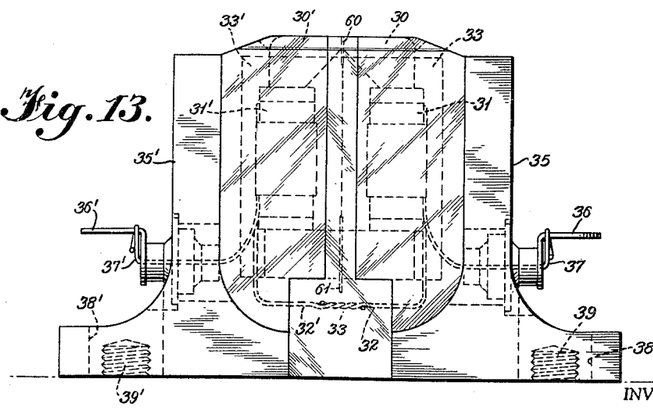
FIGURE 13 is a view in end elevation of the finished multi-unit recorder head.

A pair of pins 51 are received in these holes and project above the bed 50. The dimension between the centers of the two pins 51 is thus 1.7289 inches with a tolerance of 0.0005 inch. As will be evident, this dimension will be exactly the same as the distance which must be maintained between the holes defined by the aluminum starting pieces 35 of the right half subassembly and 35' of the left half subassembly. As will be recalled, the holes in the starting pieces are the ones in which the pin 25 of the stacking fixture was received during the formation of the subassemblies. The left and right half subassemblies are placed onto the bed 50 facing each other with a pin 51 received in the reference hole defined by each aluminum starting piece. Fixed to each side of the bed 50 by means of threaded elements 52 are brackets 53. Threaded elements 54 are threaded through the brackets 13 at an angle and have attached at their lower ends clamping plates 55 which are shaped to match the profile of the subassemblies. With the subassemblies mounted on the pins 51 they are free to pivot on the bed 50. The clamping plates 55 are then engaged with the subassemblies and the threaded elements 54 are rotated in a direction to advance them toward the bed 50. By this action, the two subassemblies are pivoted together and will properly align since the pins 51 will be holding the reference dimension. Immediately prior to moving the two subassemblies together, strips of non-magnetic permeable material such as aluminum foil are positioned at the points of contact of corresponding laminated core halves 30 and 30' so that upon moving the two subassemblies together, corresponding laminated core halves 30 and 30' will be spaced by means of the non-magnetic permeable strips. This feature is best illustrated in FIGURE 10, wherein the non-magnetic permeable strips are designated 60 and 61. Also prior to pivoting the two subassemblies together, the corresponding leads 32 and 32' of corresponding coils 31 and 31' are spliced together. This also is best illustrated in FIGURE 10 wherein it will be evident that a coil lead 32 and its corresponding coil lead 32' are spliced together as indicated at 33. Thus, the two coils of each unit are connected in series with the result that currents induced in the two coils by extraneous fields are of opposite polarity and therefore cancel each other. FIGURE 10 shows the two subassemblies as they are positioned together in the clamping fixture prior to pouring of additional resin to bond the subassemblies together. With the two subassemblies pressed together, by means of the clamping fixture, additional incapsulating plastic material is poured into the space defined between the two subassemblies and allowed to set and harden. Side plates 57 attached to bed 50 of the clamping fixture aid in confining the space between the subassemblies. Thereafter, the assembly is removed from the clamping fixture and its top surface is profiled to leave only the laminated core halves 30 and 30' exposed, as shown in FIGURES 11 to 13. The exposed surfaces of the laminated core halves are then ground and lapped flat to produce a finished multi-unit electromagnetic head.

Figures 14, 15:
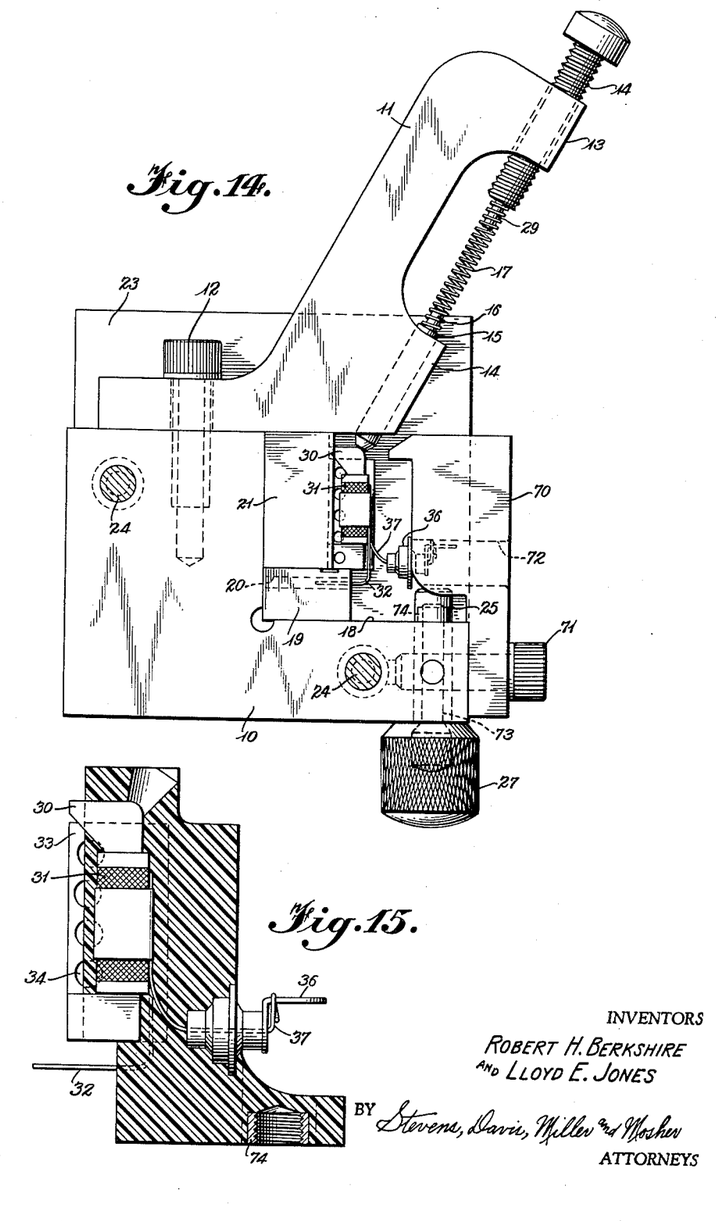
FIGURE 14 is a view in side elevation similar to FIGURE 1, but modified to illustrate the production of an alternative form of a multi-unit electromagnetic head.
FIGURE 15 is a view in section similar to the sectional view of FIGURE 6 showing the right half subassembly of the alternative form after it has been removed from the stacking fixture shown in FIGURE 14.

There is shown in FIGURES 14 and 15 the method of preparing an alternative form of the present invention. FIGURE 14 shows the same stacking fixture as is illustrated in FIGURE 1 with only one slight modification. There is provided attached to the front wall of the main body 10 a mold plate 70. The attachment is effected by means of Allen-head cap screws 71 in a conventional fashion. The surface of the mold plate 70 facing the gauge blocks 21 is profiled to impart to a casting resin to be introduced into the space defined between the mold box 70 and the gauge blocks 21 a suitable final shape which in this instance conforms to the shape of the starting piece 35 described with reference to the above described multi-unit head. This will be evident from FIGURE 14. In addition, the mold plate 70 defines a series of five horizontally aligned through bores 72 which furnish, in these circumstances, passages to receive the terminal connectors 36, which need not be of the insulated type, and hold them in position during the casting operation. In this arrangement, the reference holes 38 or 38', previously discussed in conjunction with the first form of the invention, are actually cast into the left and right subassemblies as they are made. This is done by casting the resin around the pin 25 which is removed after the resin has set and hardened. There is also provided a pin 73 which projects above the surface 18 of the main body 10. This pin is positioned approximately half way between pins 25 and 26 and thus projects to intercept the casting resin about half way along the length of the subassembly being cast or in other words, at the same position as hole 39 in the starting piece 35 of the first form. An internally threaded cap 74 is positioned on pin 73 prior to pouring the casting resin to make the equivalent of hole 39 in the first form. Thereafter, the resin is introduced into the confined space defined by blocks 19 and 21, surface 18 and plate 70 and permitted to set and harden, whereupon a subassembly is removed having the character as shown in FIGURE 15. Left and right half assemblies made in this fashion are ground and lapped in the same manner as the left and right half subassemblies of the first form. The left and right halves are then suitably spaced to establish a gap and joined together as before to produce a final product which in this instance differs from that of the first form by not using aluminum starting piece 35, but rather forming the necessary backing and terminal supporting structure in situ during the casting operation. Economy of manufacture is thus effected by the elimination of starting pieces 35 and use of non-insulated terminals instead of the more expensive insulated type. As mentioned, the alternative forms for left and right subassemblies made as described with reference to FIGURES 14 and 15 are joined together and finished in identically the same way as the first described form of the invention.

Although the present invention has been shown and described with reference to specific forms and manipulative steps, nevertheless, various changes and modifications obvious to one skilled in the art from a knowledge of the teaching of the present invention are deemed to be within the spirit and scope of the present invention. It will also be appreciated that all dimensions given herein are merely illustrative of specific forms of the invention and are not to be construed as placing undue limitations on the scope thereof.

What is claimed is:

1. A method of making a multi-unit electromagnetic head which includes the steps of establishing a fixed reference point, establishing in fixed spaced relationship to said reference point a series of half core elements with coils wrapped therearound, partially incapsulating said series of elements in a suitable resin to fix the relationships of said elements with respect to said reference point within the incapsulated mass and to produce a sub-assembly, establishing a second fixed reference point, establishing in fixed spaced relationship with respect to said second fixed reference point a second series of half core elements with coils wrapped therearound, partially incapsulating said second series of elements in additional resin to fix the relationships of said second series of elements with respect to said second reference point within the second incapsulated mass and to produce a second sub-assembly the mirror image of said first mentioned sub-assembly, establishing a fixed spaced relationship between said first and said second reference points, rotating each subassembly about its reference point and toward the other subassembly until said subassemblies come into juxtaposition with said first series of elements aligned with said second series of elements, connecting the coils wrapped around each pair of aligned elements in series, and completing the incapsulation of said elements with additional resin to bond said sub-assemblies into a final assembly wherein each of said elements of said first and said second series of elements is maintained in fixed spaced relationship to said first and second reference points.

2. In the mass-production manufacture of high precision multi-unit electromagnetic heads, the method steps of molding a series of spaced half core elements into a two mirror image subassemblies each containing a single reference hole at an accurately spaced dimension from each half core element, and lapping the corresponding external faces of each subassembly, and placing said subassemblies over accurately spaced precision pivots in such a manner that the dimesnion between said pivots forms a diagonal of the plan outline of the subassemblies when the latter are rotated about their respective pivots toward each other until their lapped surfaces abut an intermediately placed non-magnetic gap member.

3. In the manufacture of high precision multi-unit electromagnetic head mirror image subassemblies from a single mold, comprising: placing precision gauge blocks in said mold to align half core elements and at a precise dimension from a single fixed reference point, placing half core elements in the mold in alignment with the gauge blocks, filling the mold with non-magnetic, non-conducting, plastic encapsulating material and allowing said material to harden and embed all the core elements and the reference point.

4. Method for making multi-unit electromagnetic heads comprising:
   (a) aligning a plurality of half head sections in a fixed relationship to one another so that the head height is the same for all said sections and the pole faces of said sections are substantially in the same plane,
   (b) forming a subassembly by fixing said half head sections in a permanent relationship by means including a plastic that embeds said half head sections,
   (c) forming said means with a reference surface having a reference hole therein,
   (d) lapping the pole faces of said sections simultaneously to place all said faces in one plane that is perpendicular to said reference surface and a fixed perpendicular distance away from the centerline of said hole,
   (e) mounting two such subassemblies each to pivot about the centerline of its said hole with the pivot points spaced apart a perpendicular distance equivalent to twice said fixed perpendicular distance from said hole to the plane of said faces,
   (f) interposing thin nonmagnetic strips between said assemblies,
   (g) pivoting said assemblies together so that the lapped faces oppose one another with said strips interposed therebetween to define gaps, and
   (h) embedding said subassemblies in a plastic.

5. Method for making multi-unit electromagnetic heads comprising:
   (a) aligning a plurality of half head sections in a fixed relationship to one another so that the head height is the same for all said sections and the pole faces of said sections are substantially in the same plane,
   (b) forming a subassembly by fixing said half head sections, shields and terminals in a permanent relationship by a plastic that embeds said half head sections,
   (c) forming said plastic with a reference surface having a reference hole therein,
   (d) lapping the pole faces of said sections simultaneously to place all said faces in one plane that is perpendicular to said reference surface and a fixed perpendicular distance away from the centerline of said hole,
   (e) mounting two such subassemblies each to pivot about the centerline of its said hole with the pivot points spaced apart a perpendicular distance equivalent to twice said fixed perpendicular distance from said hole to the plane of said faces,
   (f) interposing thin nonmagnetic strips between said assemblies,
   (g) pivoting said assemblies together so that the lapped faces oppose one another with said strips interposed therebetween to define gaps, and
   (h) embedding said subassemblies in a plastic.

6. Method for making multi-unit electromagnetic heads comprising:
   (a) aligning a plurality of half head sections in a fixed relationship to one another so that the head height is the same for all said sections and the pole faces of said sections are substantially in the same plane,
   (b) forming a subassembly by fixing said half head sections in a permanent relationship to a starting piece by a plastic that embeds said sections and adheres to said piece,
   (c) forming said starting piece with a reference surface having a reference hole therein,
   (d) lapping the pole faces of said sections simultaneously to place all said faces in one plane that is perpendicular to said reference surface and a fixed perpendicular distance away from the centerline of said hole,
   (e) mounting two such subassemblies each to pivot about the centerline of its said hole with the pivot points spaced apart a perpendicular distance equivalent to twice said fixed perpendicular distance from said hole to the plane of said faces,
   (f) interposing thin nonmagnetic strips between said assemblies,
   (g) pivoting said assemblies together so that the lapped faces oppose one another with said strips interposed therebetween to define gaps, and
   (h) embedding said subassemblies in a plastic.

7. Method for making multi-unit electromagnetic heads comprising:
   (a) aligning in a fixed relationship to one another a plurality of half head sections each having wound therearound a coil with two leads projecting, said head sections being aligned so that the head height is the same for all and their pole faces are substantially in the same plane,
   (b) aligning a row of terminals in spaced relation with said sections,
   (c) attaching one lead of each coil to its aligned terminal,
   (d) interposing half shields between said half head sections,
   (e) forming a subassembly by fixing said half head sections, half shields and terminals in a permanent relationship by means that embeds said half head sections and said half shields,
   (f) forming said means with a reference surface with a reference hole therein,
   (g) lapping the pole faces of said sections simultaneously to place all said faces in one plane that is perpendicular to said reference surface and a fixed perpendicular distance away from the centerline of said hole,
   (h) mounting two such subassemblies each to pivot about the centerline of its said hole with the pivot points spaced apart a perpendicular distance equivalent to twice said fixed perpendicular distance from said hole to the plane of said faces,
   (i) interposing thin nonmagnetic strips between said assemblies,
   (j) pivoting said assemblies together so that respective half shields and respective half sections are aligned with one another and the lapped pole faces oppose one another with said strips interposed therebetween to define gaps,
   (k) attaching said other leads of respective half sections together, and
   (l) embedding said subassemblies in a plastic.

8. Method for making multi-unit electromagnetic heads comprising:
   (a) aligning in a fixed relationship to one another a plurality of half head sections each having wound there around a coil with two leads projecting, said head sections being aligned so that the head height is the same for all and their pole faces are substantially in the same plane,
   (b) aligning a row of terminals in spaced relation with said sections,
   (c) attaching one lead of each coil to its aligned terminal,
   (d) interposing half shields between said half head sections,
   (e) forming a subassembly by fixing said half head sections, shields and terminals in a permanent relationship by a starting piece upon which said terminals are mounted and a plastic that embeds said half head sections and said half shields and adheres to said starting piece, (f) forming said starting piece with a reference surface having a reference hole therein, (g) lapping the pole faces of said sections simultaneously to place all said faces in one plane that is perpendicular to said reference surface and a fixed perpendicular distance away from the centerline of said hole, (h) mounting two such subassemblies each to pivot about the centerline of its said hole with the pivot points spaced apart a perpendicular distance equivalent to twice said fixed perpendicular distance from said hole to the plane of said faces, (i) interposing thin nonmagnetic strips between said assemblies, (j) pivoting said assemblies together so that respective half shields and respective half sections are aligned with one another and the lapped pole faces oppose one another with said strips interposed therebetween to define gaps, (k) attaching said other leads of respective half sections together, and (l) embedding said subassemblies in a plastic.

9. Method for making multi-unit electromagnetic heads comprising:

(a) aligning in a fixed relationship to one another a plurality of half head sections each having wound therearound a coil with two leads projecting, said head sections being aligned so that the head height is the same for all and their pole faces are substantially in the same plane, (b) aligning a row of terminals in spaced relation with said sections, (c) attaching one lead of each coil to its aligned terminal, (d) interposing half shields between said half head sections, (e) forming a subassembly by embedding said half head sections, shields and terminals in a plastic, (f) forming said plastic with a reference surface having a reference hole therein, (g) lapping the pole faces of said sections simultaneously to place all said faces in one plane that is perpendicular to said reference surface and a fixed perpendicular distance away from the centerline of said hole, (h) mounting two such subassemblies each to pivot about the centerline of its said hole with the pivot points spaced apart a perpendicular distance equivalent to twice said fixed perpendicular distance from said hole to the plane of said faces, (i) interposing thin nonmagnetic strips between said assemblies, (j) pivoting said assemblies together so that respective half shields and respective half sections are aligned with one another and the lapped pole faces oppose one another with said strips interposed therebetween to define gaps, (k) attaching said other leads of respective half sections together, and (l) embedding said subassemblies in a plastic.

References Cited in the file of this patent

UNITED STATES PATENTS

| | | |
|---|---|---|
| 2,472,083 | Bartholdy | June 7, 1949 |
| 2,683,774 | Camras | July 13, 1954 |
| 2,691,212 | Hildebrand | Oct. 12, 1954 |
| 2,693,508 | Lord | Nov. 2, 1954 |
| 2,705,344 | Salomone et al. | Apr. 5, 1955 |
| 2,724,862 | Merrill et al. | Nov. 29, 1955 |
| 2,751,440 | De Turk et al. | June 19, 1956 |
| 2,754,569 | Kornei | July 17, 1956 |
| 2,756,280 | Rettinger | July 24, 1956 |
| 2,769,036 | Selsted | Oct. 30, 1956 |
| 2,769,866 | Kornei | Nov. 6, 1956 |
| 2,836,881 | Pollack | June 3, 1958 |
| 2,861,135 | Rettinger | Nov. 18, 1958 |
| 2,888,522 | McCutchen et al. | May 26, 1959 |
| 2,915,812 | Rettinger | Dec. 8, 1959 |
| 2,928,907 | Lubkin | Mar. 15, 1960 |

FOREIGN PATENTS

| | | |
|---|---|---|
| 699,885 | Great Britain | Nov. 18, 1953 |